June 11, 1963 R. G. WILLIAMSON 3,093,751
LOGICAL CIRCUITS
Filed Aug. 14, 1959 5 Sheets-Sheet 1
FIG. 2
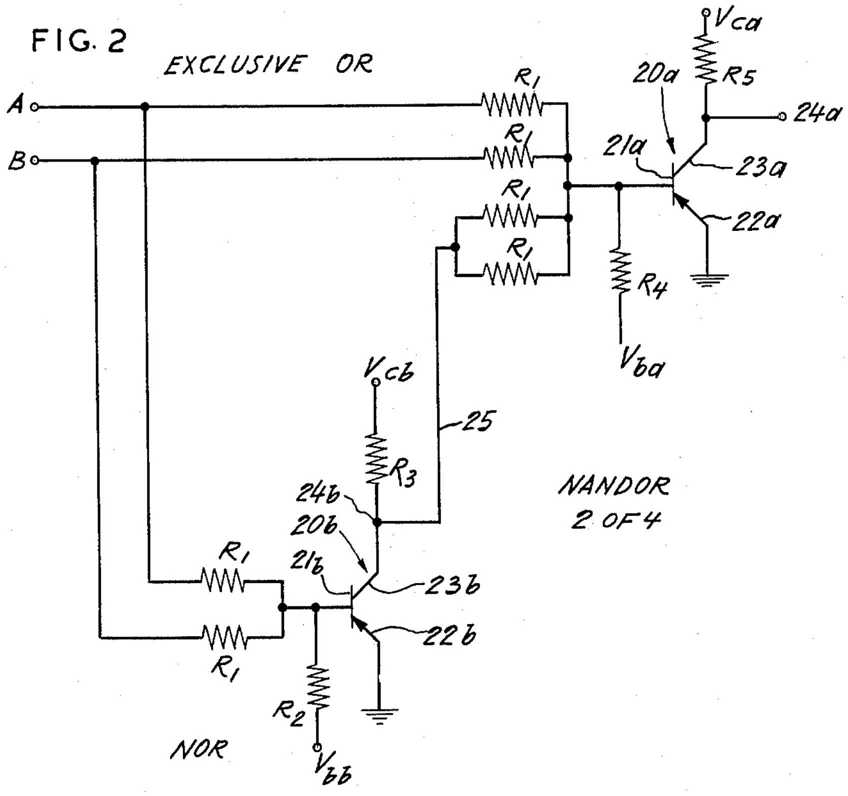
FIG. 2A
| CASE | A | B | OUTPUT |
|---|---|---|---|
| I | 0 | 0 | 0 |
| II | 1 | 0 | 1 |
| III | 0 | 1 | 1 |
| IV | 1 | 1 | 0 |
FIG. 1
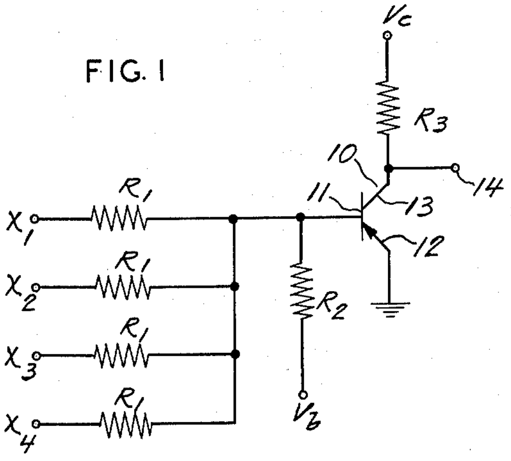
INVENTOR.
ROBERT G. WILLIAMSON
BY Richard Franklin
ATTORNEY

| CASE | A | B | OUTPUT |
|---|---|---|---|
| I | 0 | 0 | 1 |
| II | 1 | 0 | 0 |
| III | 0 | 1 | 0 |
| IV | 1 | 1 | 1 |

INVENTOR.
ROBERT G. WILLIAMSON
BY Richard Franklin
ATTORNEY

INVENTOR.
ROBERT G. WILLIAMSON

BY Richard Franklin

ATTORNEY

| CASE | A | B | C1 | SUM | C2 |
|---|---|---|---|---|---|
| I | 0 | 0 | 0 | 0 | 0 |
| II | 1 | 0 | 0 | 1 | 0 |
| III | 0 | 1 | 0 | 1 | 0 |
| IV | 0 | 0 | 1 | 1 | 0 |
| V | 1 | 1 | 0 | 0 | 1 |
| VI | 1 | 0 | 1 | 0 | 1 |
| VII | 0 | 1 | 1 | 0 | 1 |
| VIII | 1 | 1 | 1 | 1 | 1 |

INVENTOR.
ROBERT G. WILLIAMSON
BY

ATTORNEY

| CASE | X | Y | $C_1$ | DIFFERENCE | $C_2$ |
|---|---|---|---|---|---|
| I | 0 | 0 | 0 | 0 | 0 |
| II | 1 | 0 | 0 | 1 | 0 |
| III | 1 | 1 | 0 | 0 | 0 |
| IV | 1 | 0 | 1 | 0 | 0 |
| V | 0 | 1 | 0 | 1 | 1 |
| VI | 0 | 0 | 1 | 1 | 1 |
| VII | 0 | 1 | 1 | 0 | 1 |
| VIII | 1 | 1 | 1 | 1 | 1 |

INVENTOR.
ROBERT G. WILLIAMSON
BY Richard Franklin
ATTORNEY

United States Patent Office 3,093,751
Patented June 11, 1963

3,093,751

LOGICAL CIRCUITS

Robert G. Williamson, Norwalk, Conn., assignor to Sperry Rand Corporation, New York, N.Y., a corporation of Delaware Filed Aug. 14, 1959, Ser. No. 833,840
1 Claim. (Cl. 307—88.5)

This invention relates to the field of component circuitry for data-processing devices and more particularly to logical circuits such as might be used in a high speed computer.

The invention provides logical circuits composed of modular resistor-transistor switches so arranged that interconnections of several such switches provide the desired output pattern in response to applied patterns of binary inputs.

While the logical functions performed by this invention are, in general, broadly known there are provided novel circuits for performing these functions using modular transistor-resistor switches which enable circuits employing a minimum number of such switches to perform the operations with great reliability while requiring little power for their operation and at minimum component cost.

Accordingly it is an object of this invention to provide improved circuits for performing logical functions.

It is a further object of this invention to provide improved, transistorized circuits for providing the desired logical result in response to applied patterns of binary inputs.

It is a still further object of this invention to provide logical circuits composed of similar modular transistor and resistor switches.

It is a further object of this invention to provide a multilevel transistor switch having a plurality of resistance coupled base inputs adapted to be used in logical circuits.

Still other and further objects and advantages of this invention will be apparent from the specification.

The features of novelty which are believed to be characteristic of this invention are set forth with particularity in the appended claim. The invention itself, however, both as to its fundamental principles and its particular embodiments will best be understood by reference to the specification and accompanying drawings in which:

FIG. 1 is a schematic diagram of a transistor-resistor switch.

FIG. 2 is a schematic diagram of an Exclusive-OR circuit.

FIG. 2*a* is a truth table for the circuit shown in FIG. 2.

Figures 3, 3A:
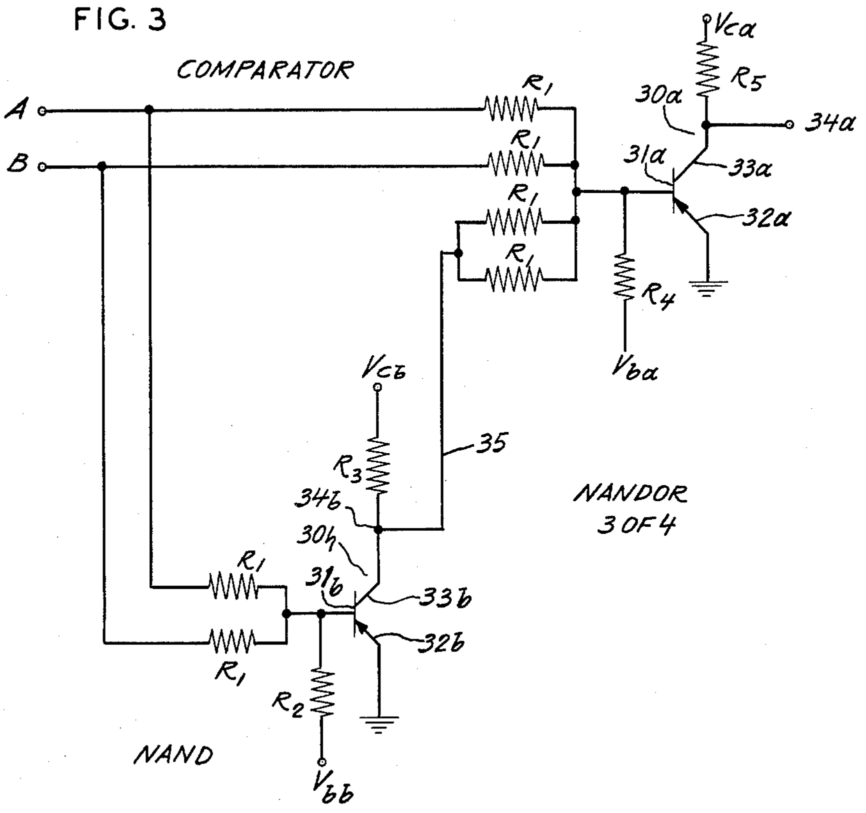

FIG. 3 is a schematic diagram of a comparator circuit.

FIG. 3*a* is a truth table for the circuit shown in FIG. 3.

Figure 4A:
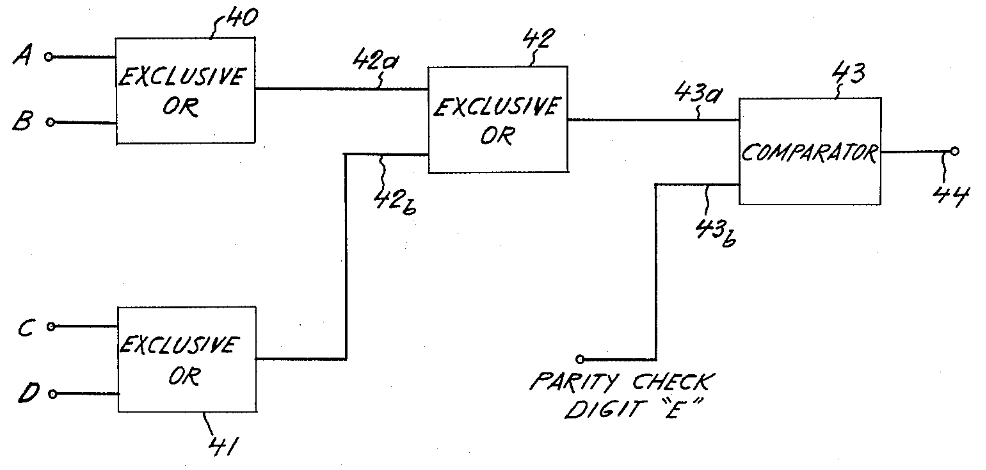

FIG. 4*a* is a block diagram of one embodiment of a Parity Check circuit constructed in accordance with this invention.

Figure 4B:
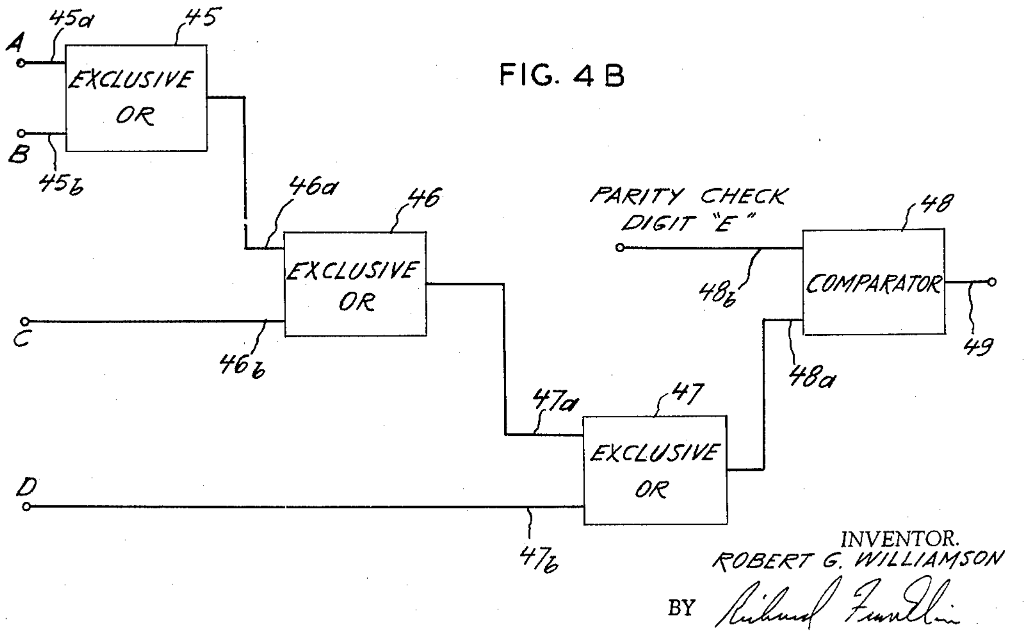

FIG. 4*b* is a block diagram of a second embodiment of such a Parity Check circuit.

Figures 5, 5A:
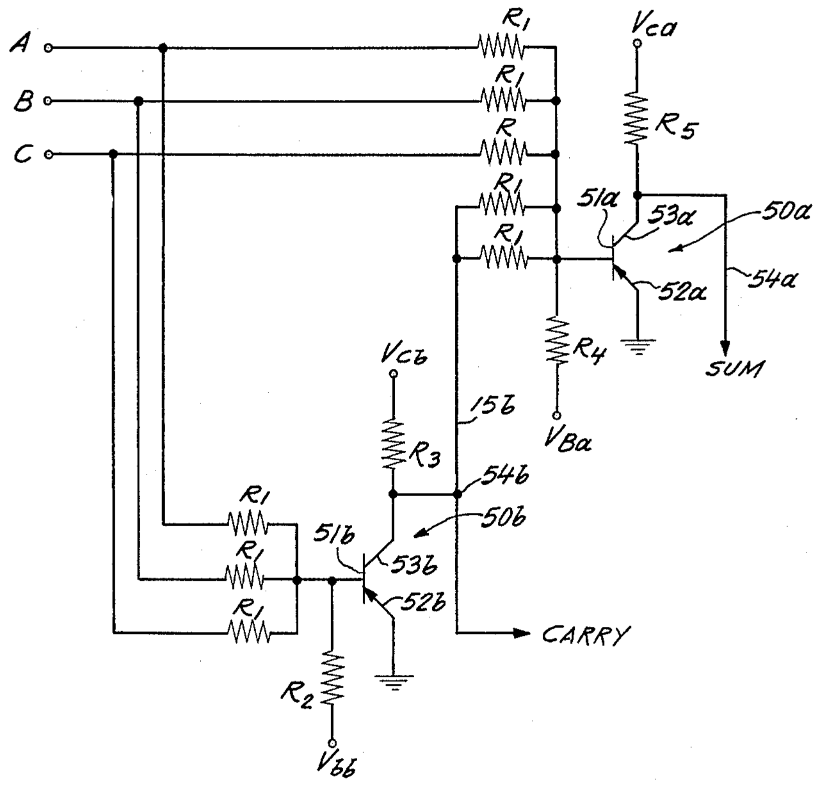

FIG. 5 is a schematic diagram of a Full Adder.

FIG. 5*a* is a truth table for the circuit shown in FIG. 5.

Figures 6, 6A:
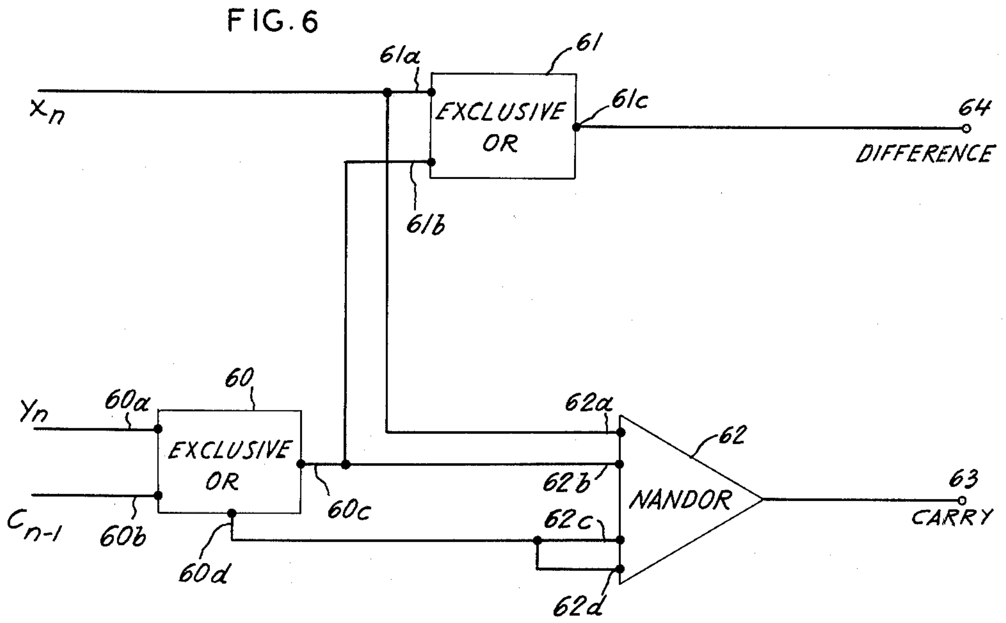

FIG. 6 is a block diagram of a Subtractor circuit.

FIG. 6*a* is a truth table for the circuit of FIG. 6.

Briefly stated, in accordance with the invention a basic modular transistor-resistor switch is provided, having circuit values chosen so that at least a predetermined number of coincident inputs are required to change the output condition thereof. The switch is constructed so as to provide an output equivalent to the complement of a multi-level AND gate.

Further, in accordance with the invention logical circuits are provided composed of several of these modular transistor-resistor switches interconnected so that the state of one or more output terminals of the circuit correctly represents the logical function intended to be performed by it.

Referring now to FIG. 1, a transistor-resistor switch is shown using a p-n-p transistor 10 having a base 11, emitter 12 and collector 13. An n-p-n transistor could be used instead with appropriate reversal of power supply polarities. Transistor 10 is connected in the grounded emitter, base input mode, as is shown, with potential source $V_b$ applying a positive bias to base 11 and potential source $V_c$ applying a negative bias to collector 13. Identical input resistors $R_1$ which might, for example, be connected to other similar switches or to any compatible source, are connected in parallel to one another and in series with transistor base 11. Resistors $R_1$, and potential source $V_b$ are chosen so that signals must be present on $m$ of the $n$ inputs to change the state of conductivity of transistor 10.

If transistor 10 is normally non-conducting, the potential at output terminal 14 is essentially that of $V_c$. When transistor 10 is made conductive by sufficient inputs to base 11, the potential at terminal 14 changes to substantially that of ground. In the embodiment shown, where $V_b$ is positive and $V_c$ is negative, transistor 10 is made conductive by a coincident plurality of negative going inputs, hence performing as an AND gate. Further, since in response to such coincident plurality of negative inputs, a change in the positive direction, i.e. from $V_c$ to ground, is produced at terminal 14, the output represents the complement of the AND function, i.e., the NOT-AND or NAND function.

It should also be noted that when the transistor is used in the grounded emitter-base input mode, as shown, it can be thought of as a voltage discrimination device. That is to say, with this configuration the base turn off-on voltage differential is very small thereby permitting reliable operation over a wide range of power supply, resistor and transistor characteristics. Hence, it is possible to use the switch shown in FIG. 1 as a multiple-level NAND circuit, i.e., one which will respond to any $m$ of $n$ possible inputs to change its output state, without requiring precisely controlled and constant power supplies, resistors and/or tube characteristics as have previous devices. Where $m<n$ such device is called a NANDOR switch and has particular value in logic circuits. For example consider a NANDOR switch with 3 inputs, the circuit values being chosen so that any 2 inputs produce an inverted output. The Boolean expression describing this action is $$T(x_1, x_2, x_3)=[x_1(x_2+x_3)+x_2(x_1+x_3)+x_3(x_1+x_2)]=(x_1x_2+x_1x_3+x_2x_3)'=$$

the inverted carry function of a binary adder

Referring now to FIG. 2, two transistor-resistor switches are shown interconnected so as to perform an "Exclusive-OR" logical function, i.e. an output is to be provided if, and only if the two inputs are unalike. This function may be described by the following Boolean algebraic notation:

$$T(a, b)=ab'+a'b$$

or may be expressed in the form of a truth table as shown in FIG. 2*a*.

In FIG. 2 input terminals A and B are connected in parallel to the base **21*a* of transistor switch 20*b* by respective identical resistors $R_1$. Transistor switch 20*a* also having emitter 22*a* and collector 23*a* is arranged in the grounded emitter, base input mode. Input terminals A and B are also coupled to base 21*b* of transistor switch 20*b* by further respective identical resistors $R_1$. Transistor switch 20*b* also having emitter 22*b*** and collector 23*b* is similarly connected in the grounded emitter, base input mode. The bases 21*a* and 21*b* are respectively connected to bias sources $V_{ba}$ and $V_{bb}$ through resistors $R_2$ and $R_4$ as is shown. Collectors 23*a* and 23*b* are respectively connected to bias sources $V_{ca}$ and $V_{cb}$ through resistors $R_3$ and $R_5$.

In the embodiment shown in FIG. 2 bias sources $V_b$ and $V_c$ and resistors $R_1$–$R_5$ are chosen so that transistor switch 20*a* is normally non-conductive and will be made conductive only by the coincident application of two or more signals of a chosen polarity to base 21*a*, and so that transistor switch 20*b* is normally non-conductive and will be made conductive by the application of one or more input signals of a chosen polarity to base 21*b*. In the non-conductive state output terminal 24*a* of transistor switch 20*a* is substantially at potential $V_{ca}$ and output terminal 24*b* of transistor switch 20*b* is substantially at potential $V_{cb}$. Lead 25 connects output terminal 24*b* to base 21*a* over a pair of parallel resistors $R_1$ which are each equal to the other resistors similarly marked.

Transistors 20*a* and 20*b* are selected in this embodiment, so that the output at terminals 24*a* or 24*b* in the nonconductive state of switches 20*a* and 20*b* are respectively equal to any one input to bases 21*a* and 21*b*. Hence, output terminal 24*b* effectively provides two inputs to base 21*a* since the coupling therebetween is provided by a pair of parallel resistors $R_1$ each equal to other resistors $R_1$. The same result could be achieved by replacing that pair of parallel resistors with a single resistor of the value $R_{1/2}$.

Assuming that the circuit values are chosen so that in the nonconducting state of switches 20*a* and 20*b* outputs 24*a* and 24*b* are negative, rising to ground when the conductivity state changes and that the switching inputs must be negative, then the circuit of FIG. 2 performs the following operations:

When neither input terminal A nor input terminal B receives a negative signal then switch 20*b* is nonconductive. Output 24*b* is negative and two negative inputs are applied to base 21*a*. As described above, switch 20*a* is conductive and output 24*a* is substantially at ground. If ground be chosen to represent a binary zero, and a negative going signal a binary one, then condition I of Table 2*a* is satisfied.

If one of terminals A or B receives a negative going signal, that signal is applied to bases 21*a* and 21*b* of switches 20*a* and 20*b* respectively. Switch 20*b*, as described above, is switched into conductivity by this single input, and output terminal 24*b* rises to ground. Therefore, base 21*a* will receive only one negative going signal, the two signals from terminal 24*b* being absent, and switch 20*a* becomes nonconductive. In this case output terminal 24*a* becomes negative indicating a binary one. Since, if a signal representing a binary one is present at either of terminals A or B, there will be a binary one at output 24*a*, conditions II and III of Table 2*a* are satisfied.

If negative going signals are coincidently applied to terminals A and B switch 20*b* is again made conductive raising output 24*b* to ground and removing two negative inputs to base 21*a*. However, the two negative signals at A and B, also applied to base 21*a*, are alone sufficient to make switch 20*a* conductive, raising the potential level of output 24*a* to ground. Since, if signals representing a binary one are applied to both input terminals A and B, there will be a binary zero at terminal 24*b*, condition IV of Table 2*a* is satisfied.

Hence, the circuit of FIG. 2 will perform an "Exclusive-OR" logical function, i.e., providing an output when and only when one of two input terminals receives a signal. In connection with the description of FIG. 6 below it will be important to remember that there will be an output representing a binary one at terminal 24*b* only when each input to terminals A and B represent binary zeros.

It should be noted that the Exclusive-OR output is the complement of a Comparator circuit, a Comparator circuit being defined as one which will provide an output only if neither or both of two input signals are present. This function may be described by the following Boolean algebraic notation:

$$T(a_1b)=ab+a'b'$$

or may be expressed in the form of a truth table, as is shown in FIG. 3*a*. If the output of terminal 24*a* of FIG. 2 were inverted, or if an alternating notation were used, i.e., negative signals at A and/or B=binary one, ground =binary zero; negative signals at terminal 24*a*=binary zero, positive signals=binary one, then the circuit of FIG. 2 could be used as a Comparator.

A preferred circuit for performing that logical operation, i.e., $T(a_1b)=ab+a'b'$, is shown in FIG. 3 and consists of two suitably interconnected transistor-resistor switches 30*a* and 30*b*. Each of these switches, having respectively bases 31*a* and 31*b*, emitters 32*a* and 32*b*, and collectors 33*a* and 33*b*, is connected in the grounded emitter, base input mode. Bias sources $V_{ba}$ and $V_{bb}$ are respectively connected to bases 31*a* and 31*b* by associated resistors $R_2$ and $R_4$. Bias sources $V_{ca}$ and $V_{cb}$ are respectively connected to collectors 33*a* and 33*b* through associated resistors $R_3$ and $R_5$.

In the embodiment shown in FIG. 3, bias sources $V_b$ and $V_c$ and resistors $R_1$–$R_5$ are chosen so that transistor switch 30*a* is normally nonconductive and will be made conductive only by the coincident application of three or more signals of a chosen polarity to base 31*a*, and so that transistor switch 30*b* is normally nonconductive and will be made conductive only by the coincident application of two input signals of said chosen polarity to base 31*b*.

In the nonconductive state output terminal 34*a* of transistor switch 30*a* is substantially at potential $V_{ca}$ and output terminal $34_b$ of transistor switch 30*b* is substantially at potential $V_{cb}$. Lead 35 connects output terminal 34*b* to base 31*a* over a pair of parallel resistors $R_1$ which are each equal to the other resistors similarly marked.

Transistors 30*a* and 30*b* are selected, in this embodiment, so that the output at terminals 34*a* and/or 34*b* when switches 30*a* and/or 30*b* are nonconductive are respectively equal to any one input to bases 31*a* or 31*b*. Hence, output terminal 34*b* effectively provides two inputs to base 31*a* since the coupling is provided by a pair of parallel resistors $R_1$, each equal to other resistors $R_1$. The same result could be achieved by replacing that pair of parallel resistors with a single resistor of the value $R_{1/2}$.

Let it be assumed that the circuit values are chosen so that in the nonconducting state of switches 30*a* and 30*b*, outputs 34*a* and 34*b* are negative, rising to ground when the conductivity state changes, and that the switching inputs to bases 31*a* and 31*b* must be negative.

Let it further be assumed that a signal at ground potential represents a binary zero and that a signal at a negative potential represents a binary one. Under these conditions, the circuit of FIG. 3 performs the following operations:

When a signal representing a binary zero is present at both of input terminals A and B (i.e. no binary one at either input terminal), transistor switch 30*b* remains nonconductive. The two effective inputs applied to base 31*a* of transistor switch 30*a* from output 34*b* are insufficient to change the conductivity state of switch 30*a*. Therefore, the potential at output terminal 34*a* will remain negative. Since, in response to the coincident application of two binary zeros the circuit provides a binary one at the output, condition I of the truth table of FIG. 3*a* is satisfied.

When a signal representing a binary one is applied to one of input terminals A or B, e.g., terminal A, and a signal representing a binary zero is applied to the other input terminal, then switch 30*b* again remains nonconductive since it is biased so as to require two coincident, negative-going base inputs to change its conductivity state. Consequently, base 31*a* of transistor switch 30*a* will receive two effective inputs from output terminal 34*b* as well as the additional input from input terminal A. These three inputs are sufficient to change the conductivity state of switch 30*a* and the potential at output terminal 34*a* will rise to substantially ground level. Since, in response to the application of a binary one at one input terminal and a binary zero at the other input terminal, the output terminal provides a binary zero, conditions II and III of the truth table of FIG. 3*a* are satisfied.

If input signals representing a binary one are applied to both of input terminals A and B coincidentally, then transistor switch 30*b* is made conductive by the two inputs to base 31*b* and the potential at output terminal 34*b* rises to substantially ground level. The two negative-going signals at terminals A and B are also applied to base 31*a* of transistor switch 30*a* but since the two effective inputs from output terminal 34*b* of transistor switch 30*b* are no longer present, transistor switch 30*a* remains nonconductive. The potential level at output 34*a* is therefore negative. Since, in response to the application of coincident input signals representing a binary one at terminals A and B a signal is provided at output terminal 34*a* representing a binary one, condition IV of the truth table of FIG. 3*a* is satisfied.

It should be noted that conditions I–IV are equally satisfied if ground is considered to be a binary one and a negative signal is considered to be a binary zero.

The comparator of FIG. 3 and the Exclusive-OR circuit of FIG. 2, each essentially composed of combinations of switches such as that described in FIG. 1, may themselves be combined to perform important logical operation necessary in modern high speed electronic devices.

Referring now to FIG. 4*a* a parity check circuit is shown which employs three interconnected Exclusive-OR units such as that shown in FIG. 2, and a Comparator unit such as that shown in FIG. 3. As is well known in the art, patterns of ones and zeros may be selected to represent numerals and/or alphabetic characters so that, by the addition of a parity signal, either a one or a zero depending on the particular pattern involved, the total number of ones in every code unit is always odd or always even, as desired. One example of such a code, based on four significant code positions plus a fifth parity check position, is as follows:

| Arabic number | Binary number | Parity symbol |
|---|---|---|
| 0 | 0 0 1 1 | 1 |
| 1 | 0 1 0 0 | 0 |
| 2 | 0 1 0 1 | 1 |
| 3 | 0 1 1 0 | 1 |
| 4 | 0 1 1 1 | 0 |
| 5 | 1 0 0 0 | 0 |
| 6 | 1 0 0 1 | 1 |
| 7 | 1 0 1 0 | 1 |
| 8 | 1 0 1 1 | 0 |
| 9 | 1 1 0 0 | 1 |
| 10 | 1 1 0 1 | 0 |

In checking a code, such as is shown in the above table, each number, if correct, must have an odd total of ones.

The circuit of FIG. 4*a* checks first on the four significant positions of each code by means of the three Exclusive-OR units. As will be seen there is an output from the last of these three units if and only if there is one or three binary ones. The output from this last Exclusive-OR unit is applied as one input to a Comparator unit which has as its other input the appropriate parity check symbol.

The odd check on the four significant positions is as follows, assuming a four position code, i.e., A, B, C, and D, and a fifth parity check position E:

Signals in positions A and B, a negative signal representing a binary one, a signal at ground level, a binary zero, are applied coincidentally to Exclusive-OR unit 40. Exclusive-OR units 40, 41, and 42 are each identical to the Exclusive-OR unit shown in and described in connection with FIG. 2. Similarly signals at terminals C and D are coincidently applied to Exclusive-OR circuit 41. The outputs from units 40 and 41 are applied as two inputs to Exclusive-OR circuit 42.

As described above in connection with the description of FIG. 2, each of units 40, 41, and 42 will provide an output if, and only if, there is just one input thereto. Rephrased, we may say that each Exclusive-OR circuit will provide an output only in response to an odd number of inputs. Accordingly, a signal at the output terminal of unit 42 will only be present when there is a signal applied at terminal 42*a* and not at terminal 42*b* or vice versa. Such a pattern of signals is only possible if the signals applied to A, B, C, and D are as follows:

A, but not B, C, and D
B, but not A, C, and D
C, but not A, B, and D
D, but not A, B, and C
A, B, and C, but not D
A, B, and D, but not C
A, C, and D, but not B
B, C, and D, but not A When no signal is applied to any of terminals A–D, then no inputs are applied to either of terminals 42*a* or 42*b* and there is no output from Exclusive-OR circuit 42. When signals are present at all of terminals A–D coincidently, again there will be no inputs at terminals 42*a* or 42*b* and consequently no output from unit 42. If coincident signals are applied to both input terminals of either Exclusive-OR circuit 40 or Exclusive-OR circuit 41 then the output from that circuit appearing either at input terminal 42*a* or 42*b* will not be present. In the absence of signals at either of the other two input terminals, i.e., the input to Exclusive-OR circuit 40 or 41 an output therefrom appearing at the other one of input terminals 42*a* or 42*b* will also not be present and again Exclusive-OR circuit 42 will produce no output. In short, then, it can be seen that an output from Exclusive-OR circuit 42 will be present when and only when there are input signals at an odd number of input terminals at A–D.

The output from Exclusive-OR circuit 42 is applied to input terminal 43*a* of Comparator 43. Comparator 43 may be identical to the Comparator shown in and described in the reference to FIG. 3 above. The other input at terminal 43*b* of Comparator 43 is provided by the parity check digit of the particular numeral being checked. If the numeral is one which, in its correct form, has an even number of binary ones then the parity check digit will be a signal representing a binary one. If the binary number is one which in its correct form has an odd number of binary ones, then the parity check digit is a signal representing a binary zero. The input at terminal 43*a* is a binary one only when there are an odd number of binary one signals in the numeral check. If there are an even number of signals in the numeral check then the input at terminal 43*a* represents a binary zero. Since Comparator 43, as was described above, will produce an output only when both inputs are alike, i.e., both represent binary ones, or both represent binary zeros, there will be no output from that stage unless the parity check reveals an error.

If a number correctly has an odd total of ones then there will be no parity check digit applied to terminal 43*b* but there will be an input signal applied to 43*a* and hence no output from Comparator 43. Similarly, if the number correctly has an even total of binary ones there will be a parity check digit signal present at terminal 43*b* but there will be no signal at 43*a* and hence again no output from Comparator 43*b*. It is only when a parity check symbol representing a binary one is present when the machine has read an odd number of binary ones in the significant portion of the code or when no parity check symbol, i.e. one representing a binary zero, is present where the machine has read an even number of binary ones in the significant pulse of the code that there is an output from Comparator 43.

Comparator 40 could, of course, be replaced by an additional Exclusive-OR unit, whereupon the circuit would provide a signal when the binary number is correct and none when it is incorrect. Other variations of this circuit so as to provide for an "even number" parity check will be clear to those skilled in the art.

An alternative configuration of modular units for the parity check of a binary code number is shown in FIG. 4*b* and comprises three Exclusive-OR units of a type shown and described in connection with FIG. 2 and one Comparator unit of the type shown and described in connection with FIG. 3. Assuming that the binary number to be checked has five positions, four of which are significant and one of which contains the parity check symbol and that a binary one is represented by a negative pulse and a binary zero by ground, then the circuit will operate as follows:

Signals at two significant positions of a binary digit, i.e., A and B, are applied as inputs to Exclusive-OR unit 45. The output from Exclusive-OR unit 45 is applied to input terminal **46*a* of Exclusive-OR unit 46. A third significant position of the binary digit being checked is applied to input 46*b* of Exclusive-OR unit 46. The output from Exclusive-OR unit 46 is applied to input terminal 47*a* of Exclusive-OR unit 47. The last significant position of the binary digit being checked, i.e., position D is applied to input terminal 47*b* of Exclusive-OR unit 47. The output of Exclusive-OR unit 47 is applied to input terminal 48*a* of Comparator unit 48 and the parity check symbol occupying the 5th position, i.e., position E of the binary number being checked is applied to input terminal 48*b* of Comparator unit 48. An output representing a binary one from Comparator unit 48** indicates an error in the digit being checked and the absence of a signal indicates that that digit has the correct number of binary ones therein. This is clear from the following considerations:

Each Exclusive-OR unit may be considered to be an odd indicator, i.e., producing an output only when there is an odd number of binary one signals present at its two inputs. Viewed thusly, there will be an input at terminal **46*a* only where there are an odd number of inputs to Exclusive-OR unit 45. If there is a binary one signal at 46*a* there will be an output from Exclusive-OR unit 46 only if there is no signal present at position C. Consequently, an output from Exclusive-OR unit 46 applied to input terminal 47*a* could mean that there has been a binary one signal present at either position A or B, but not both, and not at position C. If there were no binary one signals at either of positions A or B or at both of positions A and B then there would be no binary one signal at input terminal 46*a* and consequently there could be an output from Exclusive-OR unit 46 only if there were a binary one signal at position C. In either of these two cases it should be noted that there is an input applied to terminal 47*a* only if there has been an odd number of binary signals at terminal A, B, and/or C. Of course, the absence of an input signal at terminal 47*a*** necessarily means that there have been binary one signals at an even number of positions.

Assuming that there is an input signal representing a binary one at terminal **47*a*, i.e., binary one signals at an odd number of positions A–C, then there will be an output from Exclusive-OR unit 47 only if there is no binary one signal at position D so that an output from Exclusive-OR unit 47 applied to input terminal 48*a* again means that there has been a signal representing a binary one at an odd number of terminals of positions A–D. If there is no signal representing a binary one at input terminal 47*a*, i.e., there has been a signal representing a binary one at an even number of positions A–C then there will be an output from Exclusive-OR unit 47 only if there is a binary one signal present at position D so that in this case, too, since an even number plus one equals an odd number, an output from Exclusive-OR unit 47** necessarily implies that there has been a signal representing a binary one present at an odd number of positions A–D.

Hence, and in summary, there will be an input applied to terminal **48*a* of Comparator 48 only when there are in fact signals representing a binary one at an odd number of positions A–D. The other terminal 48*b* of Comparator 48** will receive a signal representing a binary one when and only when there should have been signals representing a binary one at an even number of input terminals A–D. Consequently, as was the case with the circuit shown in FIG. 4*a*, the circuit of FIG. 4*b* will provide an output at output terminal 49 only if a binary check symbol when added to the total number of binary ones produces an even total of binary ones. The circuit of FIG. 4*b*, however, will permit the check of a binary unit having an odd number of significant places, simply by the addition of further Exclusive-OR units whereas the circuit of FIG. 4*a* can operate only where the number of significant places are even.

Referring now to FIG. 5 wherein an adder is shown having as elements thereof two switches of the type shown in FIG. 1, like numerals refer to parts common to the two figures. Input terminals A and B might have applied thereto separate patterns of signals representing binary ones and binary zeros which are to be added, and terminal C might receive a signal representing the binary carry from a previous adder stage.

Transistor-resistor switches **50*a* and 50*b*, each having a base 51*a* and 51*b*, emitter 52*a* and 52*b* and a collector 53*a* and 53*b* are each connected in the grounded emitter, base input mode, switch 50*a* having five parallel input paths and switch 50*b* having three parallel input paths. The fourth and fifth inputs to switch 50*a* are taken from output terminal 54*b* of switch 50*b* and are applied to base 51*a*** through a pair of parallel resistors $R_1$ each of which are equal to each of the other input resistors $R_1$. These two parallel resistors could, of course, be replaced by a single resistor having the value $R_{1/2}$.

If output terminal **54*a* represents the sum output of a binary adder and output terminal 54*b* represents the carry output thereof, then changes in the output condition of switches 50*a* and 50*b*** must occur only in response to the following conditions:

Change in **10*a*** if and only if:

$$AB'C'+A'BC'+A'B'C$$

Change in **10*b*** if and only if:

$$ABC'+AB'C+A'BC$$

This may be expressed in the form of a truth table as is shown in FIG. 5*a*. As will become apparent, these conditions are exactly satisfied by the circuit of FIG. 5.

Bias sources $V_{ba}$, $V_{bc}$, $V_{ca}$ and $V_{cb}$ and resistors $R_2$–$R_5$ are chosen so that transistor switches **50*a* and 50*b* are normally nonconductive, each having substantially $V_c$ potential at their respective output terminals 54*a* and 54*b*. Switch 50*a* is a level-of-three NANDOR circuit, changing its output condition in response to at least three coincident negative inputs, and switch 50b is a level-of-two NANDOR circuit, changing its output condition in response to at least two coincident negative inputs. Let it be assumed that a change in output condition at either of terminals 54*a* or 54*b* indicates a binary one thereat. In the absence of any signal at terminals A, B, and C, switches 50*a* and 50*b* stay nonconductive, and the potential at outputs 54*a* and 54*b*** remain negative, due to the negative bias sources $V_{ca}$ and $V_{cb}$. Since, in response to signals representing a binary zero at each of input terminals A, B, and C, there is no change in condition at either the sum or carry output terminal, condition I of Truth Table 5*a* is satisfied.

When only one of input terminals A, B, and C receives a negative signal, e.g., terminal A, the single signal applied to base 51b is insufficient to make switch 50b conductive, therefore output terminal 54b remains unchanged and the two negative inputs normally applied to base 51a of switch 50a from output 54b, remain. The signal at terminal A is also applied to base 51a, and consequently switch 50a receives a total of three negative inputs, a number sufficient to make it conductive causing a more positive signal to appear at its output.

Since, with a signal representing a binary one applied to one of input terminals A, B, or C, the sum output 54a changes condition and the carry output 54b does not, conditions II, III, and IV of the Truth Table *5a* are satisfied.

When negative inputs are coincidently received at two of terminals A, B, and C, e.g., terminals A and B, then switch 50b, a level-of-two NANDOR switch, is made conductive changing the output potential at terminal 54b from the negative value $V_{cb}$ to substantially ground. This change at terminal 54b removes the two negative inputs to base 51a so that level-of-three NANDOR switch 50a is not made conductive, and its output remains unchanged even though the signals at terminals A and B were also applied to base 51a.

Since, in response to the application of signals representing a binary one to two of input terminals A, B, and C, there is no change of condition at sum output 54a but there is a change of state at carry output 54b, conditions V, VI, and VII of Truth Table *5a* are satisfied.

Finally, when there are coincident negative signals at each of terminals A, B, and C, NANDOR switch 50b is again made conductive, changing the condition of output 54b and removing the two negative inputs to NANDOR switch 10a through lead 15b. However, switch 50a, being a level-of-three NANDOR circuit, the three signals at terminals A, B, and C are sufficient to make switch 50a conductive changing the condition of output 54a.

Since, in response to the application of three coincident signals representing binary ones there is a change of state both at sum output 54a and at carry output 54b, condition VIII of the above table is satisfied.

Referring now to FIG. 6 and the Truth Table *6a*, a circuit capable of performing the subtraction of two binary numbers and providing the correct difference and carry from such operation is shown. The conditions of binary subtraction are shown in FIG. *6a* and the preferred circuit for fulfilling these conditions consists of two Exclusive-OR units 60 and 61 and a multilevel NANDOR switch 62 suitably interconnected. Exclusive-OR units 60 and 61 are of the type shown in and described in connection with FIG. 3. The NANDOR unit 62 is of the type shown in and described in connection with FIG. 1, its bias levels and resistor values being chosen so that it will change its conductivity state in response to negative going input signals applied coincidently to any two of its four input terminals 62a–62d. Absent at least two such negative going inputs there will be a negative signal representing a binary one at carry output terminal 63 and in the presence of two or more such negative input signals there will be a signal representing a binary zero at carry output terminal 63. Exclusive-OR units 60 and 61 provide a negative going signal representing a binary one at their respective outputs 60c and 61c in response to the application of a signal representing a binary one at one of each pair of inputs 60a or 60b, and 61a or 61b. The output from Exclusive-OR circuit 61 appears at the difference output terminal 64. The two inputs to Exclusive-OR unit 60, $Y_n$ and $C_{n-1}$ may represent, respectively, the subtrahend and the carry, if any, from a previous subtraction. Output 60c of Exclusive-OR unit 60 is applied to input terminal 61b of Exclusive-OR unit 61. The other input to Exclusive-OR unit 61 which might represent the minuend is provided from terminal $X_n$ which, like terminals $Y_n$ and $C_{n-1}$, might be any compatible source. Terminal $X_n$ is also connected to NANDOR unit 62 through input terminal 62a. Output terminal 60c of Exclusive-OR unit 60 is similarly connected to NANDOR unit 62 through input terminal 62b. Output terminal 60d of Exclusive-OR unit 60 represents an output taken from collector 24b of NANDOR OR switch 20b of FIG. 2. As will be recalled from the description of that figure, a signal representing a binary one is present at the output terminal if and only if there is no signal present at either of the two input terminals of the Exclusive-OR unit. Output terminal 60d of Exclusive-OR unit 60 is connected to NANDOR unit 62 through a pair of input terminals 62c and 62d, hence a single output at terminal 60d has the effect of two outputs to NANDOR unit 62. The operation of the circuit is as follows:

Assuming that there are no signals present at any of terminals $X_n$, $Y_n$, $C_{n-1}$, there will be no output at terminal 60c and 61c thereby providing a binary zero at difference output terminal 64. There will be no signal applied to input terminal 62a or 62b of NANDOR unit 62 but there will be inputs at terminals 62c and 62d from output terminal 60d of Exclusive-OR unit 60. Consequently, since NANDOR unit 62 changes its output condition in response to two inputs thereto, the negative potential at carry output terminal 63 will rise to ground indicating the presence of a binary zero for the carry. Since, in response to the presence of a binary zero at each of terminals $X_n$, $Y_n$, and $C_{n-1}$, there is a binary zero at the difference output terminal and a binary zero at the carry output terminal, condition I of the truth table of FIG. *6a* is satisfied.

If there is a binary one applied to terminal $X_n$ and a binary zero applied to terminals $Y_n$, $C_{n-1}$, then there will be no output at terminal 60c and hence no input at terminal 61b. Since, however, there is an input at terminal 61a of Exclusive-OR unit 61 there will be a binary one output at terminal 61c thereof which will appear as a binary one at the difference output terminal 64. NANDOR unit 62 still receives two inputs from output terminal 60d of Exclusive-OR unit 60, in addition to the further input at terminal 62a from terminal $X_n$ and hence the carry output terminal 63 still provides ground potential representing a binary zero. Since, in response to the presence of a binary one at the minuend position and a binary zero at both the subtrahend and carry positions, a binary one is provided at he difference output terminal and a zero is provided at the carry output terminal, condition II of the truth table of FIG. *6a* is satisfied.

If a signal is present at terminal $X_n$ and either of terminals $Y_n$ or $C_{n-1}$ but not both, e.g., $Y_n$, then Exclusive-OR unit 60 will provide a binary one at output terminal 60c which will be applied to input terminal 61b of Exclusive-OR unit 61. Since there is also a signal present at input terminal 61a of unit 61, there will be no binary one present at output terminal 61c and hence there will be a binary zero present at difference output terminal 64. The binary one signal from output terminal 60c will be applied to input terminal 62b of NANDOR switch 62. The binary one signal at terminal $X_n$ will also be applied to NANDOR unit 62 to input terminal 62a. There will be no binary one output from 60d of Exclusive-OR unit 60 but since binary one signals are present at two of the four inputs of NANDOR unit 62 a signal representing a binary zero is still provided at carry output terminal 63. Since, in response to a binary one signal at the minuend terminal and a binary one at either the subtrahend or carry terminal but not both, a binary zero is present at both the difference output terminal and the carry output terminal, conditions III and IV of the truth table of FIG. *6a* are satisfied.

If there is no signal representing a binary one present at terminal $X_n$ and a signal representing a binary one is present at either terminal $Y_n$ or $C_{n-1}$ but not both, e.g., $C_{n-1}$, then there will be a signal representing a binary one provided at output terminal 60*c* of Exclusive-OR unit 60. This output signal is applied to input 61*b* of Exclusive-OR unit 61. Since there is no signal applied to input terminal 61*a* there will be a binary one provided at output terminal 61*c* thereof and hence a signal representing a binary one will be present at this output terminal 64. There will be no signal applied to input terminal 62*a* of NANDOR switch 62 and there will be no input applied to terminal 62*c* and 62*d* of that unit since there will be no output present at output terminal 60*d* of Exclusive-OR unit 60. There will be a signal representing a binary one applied to input terminal 62*b* of NANDOR unit 62 but since two coincident input signals are required to change its conductivity state the single input at terminal 62*b* is insufficient and a negative output indicating a binary one will be present at carry input terminal 63. Since, in response to the absence of a signal representing a binary one at the minuend and the presence of such a signal at either the subtrahend or carry but not both, there is provided a signal representing a binary one at both the difference output terminal and the carry output terminal, conditions V and VI of the truth table of FIG. 6*a* are satisfied.

If there is no binary one present at terminal $X_n$ and there is a signal representing a binary one present at both terminals $Y_n$ and $C_{n-1}$ coincidently, then there will be no binary one present at either of output terminals 60*c* or 60*d* of Exclusive-OR circuit 60. Consequently both input terminals 61*a* and 61*b* of Exclusive-OR unit 61 will have signals representing a binary zero coincidently applied thereto and the signal appearing at output terminal 64 will be a binary zero. Further, since each of input terminals 62*a*–62*d* of NANDOR unit 62 receives signals representing a binary zero, the output from unit 62 will remain negative and this negative signal, representing a binary one, will appear at carry output terminal 63. Since, in response to a binary zero signal at the minuend terminal and a binary one signal at both the subtrahend and carry terminals coincidently, there is provided a binary zero at the difference output terminal and a binary one at the carry output terminal condition VII of the truth table of FIG. 6*a* is satisfied.

If a signal representing a binary one is present at each of terminals $X_n$, $Y_n$, and $C_{n-1}$ coincidently, then Exclusive-OR unit 60 will provide a signal representing a binary zero at each of its output terminals 60*c* and 60*d*. The signal representing a binary zero appearing at output terminal 60*c* is applied to input terminal 61*b* of Exclusive-OR unit 61. Since the other input terminal 61*a* of Exclusive-OR unit 61 will receive a signal representing a binary one from $X_n$, the output from that unit will be a signal representing a binary one which signal will appear at this output terminal 64. The signals representing a binary zero appearing at output terminals 60*c* and 60*d* of Exclusive-OR unit 60 are also applied to input terminals 62*b*, 62*c* and 62*d* of NANDOR unit 62. The signal representing a binary one applied to terminal $X_n$ will also be applied to input terminal 62*a* of NANDOR unit 62. Since NANDOR unit 62 requires the coincident application of at least two signals representing a binary one to change its conductivity state, then the single negative going signal, i.e., the one applied to 62*a* is insufficient to remove the negative output of NANDOR unit 62 and consequently a negative going signal representing a binary one will appear at carry output terminal 63. Since, in response to the coincident application of signals representing a binary one at the minuend position the subtrahend position and the carry position, there is provided a signal representing a binary one at the difference output terminal and a signal representing a binary one at the carry output terminal, condition VIII of the truth table of FIG. 6*a* is satisfied.

It should be noted that in none of the logical circuitry described in FIGS. 1–6 is there any need for additional interstage amplification, the basic transistor-resistor switch itself providing sufficient power amplification to drive connected stages. Further, any three or more terminal device providing sufficient current and voltage amplification, as well as signal inversion such as other types of semiconductors, electron emission tubes, magnetic amplifiers or the like could be substituted without departing from this invention.

While there has been shown and described in this application certain preferred embodiments of the invention and the best mode in which it is contemplated employing that invention, it should be understood that modifications and changes may be made without departing from the spirit and the scope of the invention as will be clear to those skilled in the art.

I claim:

An "exclusive or" circuit comprising:

(*a*) a single pair of input terminals;

(*b*) a pair of switching circuits each including biasing means, an input line, and an output line;

(*c*) a pair of resistance networks;

(*d*) a first one of the networks comprising first and second resistances connected in parallel between the input line of a first switching circuit and respective first and second input terminals;

(*e*) the first switching circuit being adapted and biased, and the first and second resistances being chosen, so that there is produced on the first switching circuit output line—

(I) a selected binary "one" signal level, when and only when a selected binary "zero" signal level is applied to both the first and second resistances, (II) the said "zero" signal, when the said "one" signal is applied to one or more of the first and second resistances;

(*f*) a second one of the networks comprising third, fourth, and fifth resistances connected in parallel between the input line of a second switching circuit and the first input terminal, second input terminal, and first switching circuit output line respectively;

(*g*) the series resistance provided by the fifth resistance between the second switching circuit input line and the first switching circuit output line being half that provided by either the third or fourth resistance between the second switching circuit input line and either of the input terminals, whereby any signal applied to the fifth resistance is equivalent to two such signals applied to the third and fourth resistances respectively;

(*h*) the second switching circuit being adapted and biased, and the third, fourth, and fifth resistances being chosen, so that there is produced on the second switching circuit output line—

(I) the said "zero" signal, when the said "one" signal is applied to both the third and fourth resistances or to the fifth resistance, (II) the said "one" signal, when and only when the said "zero" signal is applied to at least one of the third and fourth resistances and also to the fifth resistance;

(*i*) whereby a "zero" output from the second switching circuit indicates either—

(I) "one" inputs applied by both input terminals to the third and fourth resistances, (II) or "zero" inputs applied by both input terminals to the first and second resistances, thereby causing a "one" input to be applied by the first switching circuit to the fifth resistance;

(*j*) and whereby a "one" output from the second switching circuit indicates a "zero" output applied by one of the input terminals to the third or fourth resistance, and a "one" input applied by the other of the input terminals to the first or second resistance, thereby causing a "zero" input to be applied by the first switching circuit to the fifth resistance.

References Cited in the file of this patent

UNITED STATES PATENTS

| | | |
|---|---|---|
| 2,801,405 | Oliwa | July 30, 1957 |
| 2,837,278 | Schreiner et al. | June 3, 1958 |
| 2,846,593 | Sands | Aug. 5, 1958 |
| 2,857,100 | Franck et al. | Oct. 21, 1958 |
| 2,868,999 | Garfinkel et al. | Jan. 13, 1959 |
| 2,901,640 | Steinman | Aug. 25, 1959 |
| 2,905,833 | Miehle | Sept. 22, 1959 |
| 2,926,850 | Richards | Mar. 1, 1960 |
| 2,954,168 | Maddox | Sept. 27, 1960 |

FOREIGN PATENTS

| | | |
|---|---|---|
| 765,326 | Great Britain | Jan. 9, 1957 |

OTHER REFERENCES

Richards: Arithmetic Oper. in Digital Computers, D. Van Nostrand Co,, Inc., Princeton (1955), p. 117.

Hartree: Calculating Instruments and Machines, University of Illinois Press, Urbana (1949), p. 98.

Wilkes: Automatic Digital Computers, John Wiley & Sons, New York (1956), pp. 233–35.

Millman et al.: Pulse and Digital Circuits, McGraw-Hill Book Co., 1956, p. 565.